June 10, 1930.  P. C. SEEL  1,762,934
COMBINED HUMIDIFIER AND PROJECTOR
Filed Feb. 10, 1927
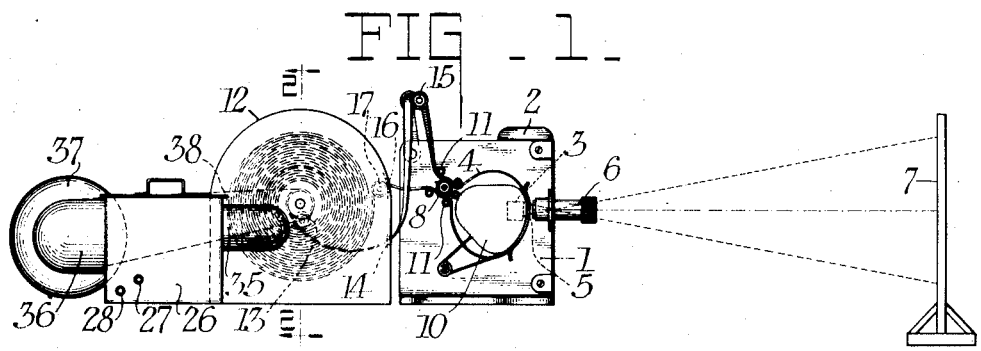
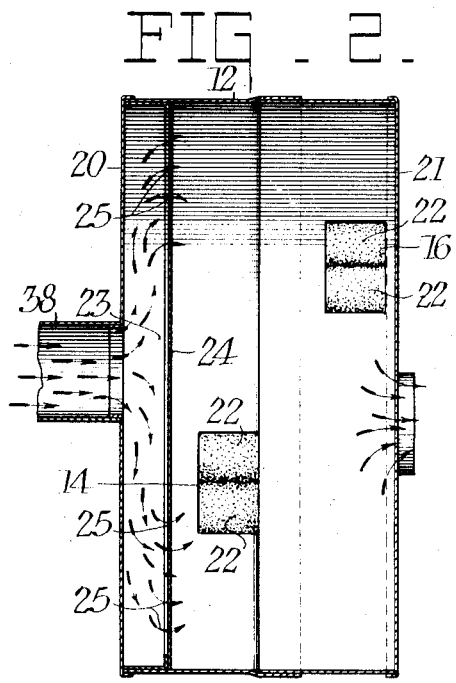
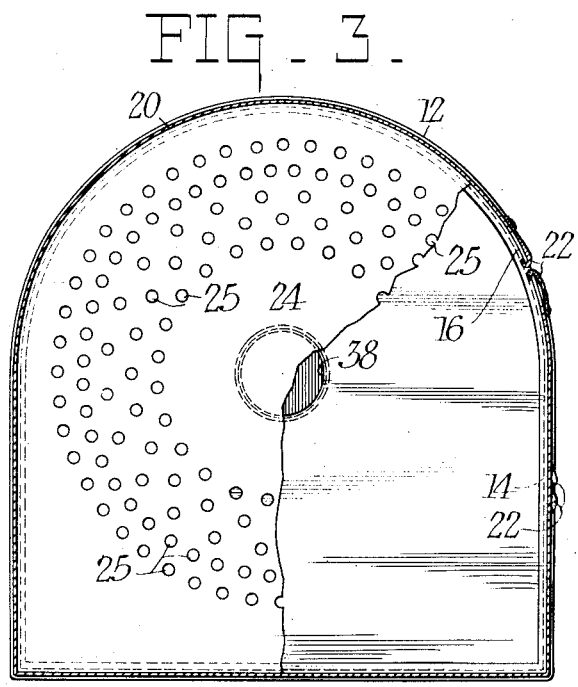
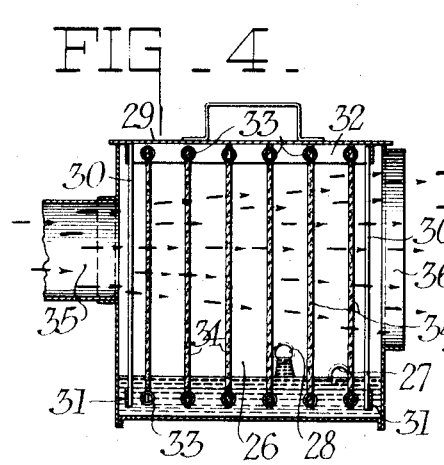
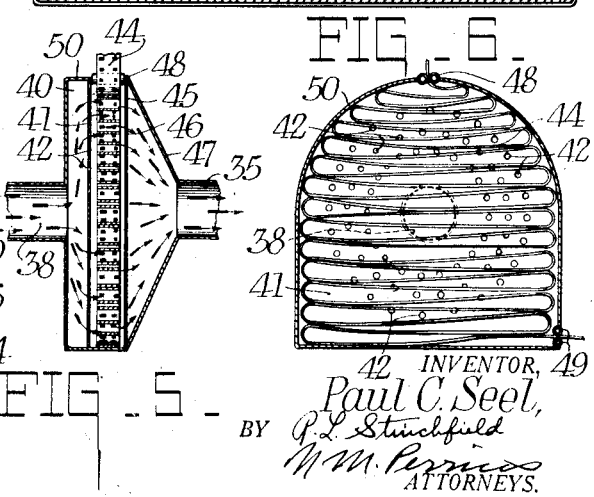
INVENTOR,
Paul C. Seel,
BY
ATTORNEYS.

Patented June 10, 1930

1,762,934

UNITED STATES PATENT OFFICE

PAUL C. SEEL, OF ROCHESTER, NEW YORK, ASSIGNOR TO EASTMAN KODAK COMPANY, OF ROCHESTER, NEW YORK, A CORPORATION OF NEW YORK

COMBINED HUMIDIFIER AND PROJECTOR

Application filed February 10, 1927. Serial No. 167,310.

This invention relates to motion picture apparatus, and particularly to a combined motion picture humidifier and projector. One object of my invention is to provide a machine especially adapted for projecting film for long periods of time without attention from an operator, such machines being especially useful for advertising purposes. Another object is to provide a machine which will condition the film during use. Another object is to provide a machine for humidifying the atmosphere of a film magazine to prevent the film from becoming brittle from the heat of the projector. Another object is to provide a machine for evenly distributing the desired degree of moisture through the film convolutions in a storage chamber. Another object is to provide a machine in which the greater portion of the film is retained in the humidifying chamber while only a comparatively short length of film passes from this chamber during projection, and other objects will appear hereinafter from the following specification, the novel features being particularly pointed out in the claims at the end thereof.

Coming now to the drawings wherein like reference characters denote like parts throughout:

Fig. 1 is a side elevation of a combined motion picture film humidifier and projector constructed in accordance with and embodying one form of my invention;

Fig. 2 is a section on line 2—2 of Fig. 1 with the film supporting means removed from the humidifying chamber;

Fig. 3 is a section through the humidifying chamber taken at right angles to the section 2—2;

Fig. 4 is a longitudinal section through a moisture box;

Fig. 5 is a cross section through a humidifying chamber showing another form of my invention; and Fig. 6 is a longitudinal section through the humidifying chamber shown in Fig. 5.

I have shown by way of illustration in Fig. 1 a combined humidifier and projector designed particularly for use in "continuous projection." Where the film is passed through a projector for long periods of time, the heat from the projection system removes the moisture from the film band, and, consequently, it becomes brittle and unfit for use. With the machine shown in Fig. 1 I replace the moisture in the film at one station while a certain amount of the moisture is removed from the film as it passes through the projector. In this way the film is kept with the proper moisture content; and ruptures due to brittle film may be avoided.

In Fig. 1, I have provided a projecting machine 1 which may be of any well known type, equipped with a lamp house 2 and a suitable condenser system, not shown, which may direct a light beam to an angularly disposed mirror 3 by which the beam is reflected through the film 4 which lies in front of the projection window 5. A suitable objective is mounted in the barrel 6 so as to project an image of the film upon the screen 7. A constantly rotating sprocket wheel 8 moves the film 4 to and from the housing 10 which contains the usual pull down mechanism. Guide rollers 11 retain the film on sprocket 8.

In the embodiment of my invention shown in Fig. 1, there is an endless band of film 4, the bulk of which is contained in a storage magazine 12 which may contain an endless film carrier of any well known type. The film 4 is drawn from the film carrier over a roller 13 at the center of the film convolutions from which the film passes out through an opening 14, and thence over a roller 15 through the projector 1. From the projector the film 4 passes into an opening 16 over a roller 17 on to the outside convolution of film, thus only a small part of the total film band is outside of the film magazine 12 while the projector is in operation.

The film magazine 12, as best shown in Figs. 2 and 3, may consist of a pair of relatively separable shells 20 and 21 of sufficient size to enclose the desired type of film carrier. Shell 20 contains an exit opening 14 and this opening is faced with soft felt pads 22 so that the film will not be scratched in passing through the wall of the magazine. Shell 21 has the entrance opening 16 which is likewise faced with pads 22. Shell 20 is preferably provided with a shallow compartment 23 which is separated from the rest of the magazine by means of a partition 24 which is apertured at 25. This partition forms a moisture distributing plate as will hereinafter be more fully described.

Moist air is continuously circulated in the following manner: There is a moist box 26 having an inlet pipe 28 and an outlet pipe 27, as best shown in Fig. 4. Water may be introduced through pipe 28 and pipe 27 limits the height of the water level in the moist box. A cover 29 is provided for box 26, and this cover is equipped with a frame consisting of corner members 30 extending downwardly to and supporting a frame 31 at the lower end, and upwardly to a frame 32, the upper end of which is affixed to the cover 29. I preferably provide frames 31 and 32 with a series of spaced coil springs 33. Between convolutions of the springs I mount a series of wicks 34. These wicks will absorb moisture from the bottom of the moist box 26, and as air is circulated through the moist box, the moisture will be carried from the wicks into the humidifying chamber in the following manner: A pipe 35 leads from the humidifying chamber 12 to the moist box, and pipe 36 leads from the moist box to a suitable blower 37, and from this blower a pipe 38 leads the moisture laden air into chamber 23.

As shown in Fig. 2 the moist air entering chamber 23 is distributed by plate 24 so that it passes through the apertures 25 to the film convolutions 39. The film magazine is, therefore, provided with an atmosphere maintained at a high humidity so that the film band may absorb moisture therefrom.

In Figs. 5 and 6 a slightly different type of film storage chamber is provided. Here the chamber consists of a compartment 40 into which the humid air is introduced through a pipe 38 as in the first described embodiment of my invention. Chamber 40 includes a wall 41 perforated at 42 to admit the air which follows the directions indicated by the arrows. The film band 44 lies in a series of loose folds between plate 41 and a similar plate 45 which may be also perforated at 46 and from which a cone-shaped wall 47 leads to the exit pipe 35. The film may enter this chamber through a pair of guide rollers 48 at the top, and may be drawn from the chamber through the guide rollers 49 at the bottom. This magazine, designated broadly as 50, may be inserted in the circulating system above described, the atmosphere being humidified and circulated by the same machine.

It is obvious that a large number of variations may be made without departing from the scope of my invention. It is not material how the film is stored in the magazine in which the film is humidified. I find that the best results may be obtained by distributing the humid atmosphere as evenly as possible over the film and for that reason have included in the preferred embodiments above described a distribution chamber one wall of which is provided with a series of perforations through which the moist air passes to the film.

The form shown in Figs. 5 and 6 is particularly efficient as the open loops of film are completely accessible to the moist air at all times and become thoroughly humidified and flexible between successive projections.

It is to be understood that the provision of the fan, while useful, is for the purpose of insuring a circulation of the air and replenishing of the moisture, but it is by no means necessary that it be kept continuously in operation, particularly with the form shown in Figs. 5 and 6. It is only necessary that the air about the film be maintained in a condition of high humidity.

Having thus described my invention, what I claim as new and desire to secure by Letters Patent is,—

1. Motion picture apparatus comprising a projection gate, a film magazine, mechanism for feeding and directing an endless band of film from said magazine to said gate and from said gate to the magazine, means for circulating and humidifying the air in said magazine for maintaining the atmosphere in said magazine in a condition of high humidity.

2. Motion picture apparatus comprising a projection gate, a casing including a chamber constituting a film magazine and having a perforated side wall, means for feeding and directing an endless band of film from said magazine to the gate and from the gate to the magazine, said casing including a second chamber separated from the first chamber by said perforated wall, and a humidifying element in said second chamber for maintaining the atmosphere in both chambers in a condition of high humidity.

3. Motion picture apparatus comprising a projection gate, a casing including a chamber constituting a film magazine and having parallel side walls between which film may be contained, one of said walls having perforations over its area, said casing being continued beyond said perforated wall and including a chamber, a humidifying element within said chamber, means for feeding an endless band of film from said gate to the magazine and from the magazine to the gate, the perforations in the wall serving to permit ready circulation of the air to all parts of the magazine from the other side of the said wall.

4. Motion picture apparatus including a casing comprising a closed system, an air impeller for circulating air through said system, a humidifying element in said system, means for supporting film in storage position in said system, a projection gate and means for feeding and directing a film in both directions between said gate and said supporting means.

5. Motion picture apparatus comprising a projection gate, a casing including a chamber constituting a film magazine and having parallel side walls between which film may be contained, one of said walls having perforations over its area, said casing being continued beyond said perforated wall and including a chamber, a humidifying element within said chamber, means for feeding an endless band of film from said gate to the magazine and from the magazine to the gate, and an air impeller for forcing air from said humidifying element against said perforated wall, whereby humidified air is distributed to all parts of the magazine.

Signed at Rochester, New York this 31st day of January, 1927.

PAUL C. SEEL.